July 14, 1970  E. J. DEREMO ET AL  3,520,392

OVERLOAD RESPONSIVE CLUTCH AND MOTOR EXHAUST VALVE

Filed May 16, 1968

EDWIN J. DEREMO
JOSEPH F. CARTER
WILLIAM WORKMAN, JR.
INVENTORS

BY Joseph W. Holloway
ATTORNEY

United States Patent Office 3,520,392
Patented July 14, 1970

3,520,392
OVERLOAD RESPONSIVE CLUTCH AND MOTOR EXHAUST VALVE
Edwin J. Deremo, Spring Lake, and Joseph F. Carter, Grand Haven, Mich., and William Workman, Jr., Columbia, S.C., assignors to Gardner-Denver Company, Quincy, Ill., a corporation of Delaware
Filed May 16, 1968, Ser. No. 729,674
Int. Cl. F16d *35/00*
U.S. Cl. 192—150                                    9 Claims

ABSTRACT OF THE DISCLOSURE

A torque-responsive motor shutoff for pressure fluid actuated rotary power tools such as nutsetters, screwdrivers and equivalent high speed torque devices wherein the flow of exhaust from the motor is choked off by a valve which closes when a clutch operable by torque reaction disengages the motor from the tool output spindle. To provide for substantially simultaneous clutch disengagement and choke valve actuation, the shiftable member of the clutch is adapted for unitary movement with the closure member of the choke valve.

BACKGROUND OF THE INVENTION

Torque releasing clutch mechanisms operable to disconnect a rotary output spindle from a rotary drive motor have been employed heretofore to actuate valve means to shut off motive pressure fluid to the motor. In a typical configuration of such prior art devices, a clutch mechanism having disengageable members is located between the tool motor and an output spindle which imparts final torque to a workpiece such as a nut or screw. When the clutch members are subjected to a preset final torque reaction, they shift apart as limited relative rotation therebetween is translated into axial movement. Such axial movement is coupled to a fluid shutoff valve located upstream of the drive motor by mechanical linkage means which usually includes an elongated push rod extending through the motor from the front to the rear of the tool housing. The rod may have a valve closure member attached at its rear end or may move to release a fluid actuated poppet valve.

In another type of prior art motor shutoff mechanism, a predetermined torque reaction is translated into linear movement of an actuating linkage for a valve located in the exhaust flow passage of the drive motor whereby the motor exhaust is choked, thus effecting deenergization of the motor. In such prior art exhaust choke devices, the linear movement producing mechanism may be a clutch having separable members and the shutoff valve itself may have a movable closure member which is released upon clutch disengagement and which is thereafter closed and held upon a seat by exhaust pressure forces operating against the closure member. The movable clutch member and the shutoff valve closure member are usually held together by a latch device which, upon clutch disengagement, releases the valve closure member for movement against its seat.

Shutoff mechanisms utilizing separable clutch members and coacting push rod valve actuators or unlatching choke valves are costly, are subject to jamming and frequent disrepair and are sluggish in terms of reaction time between clutch disengagement and motor deenergization.

SUMMARY OF THE INVENTION

In accordance with the present invention, the above-enumerated problems encountered with prior art shutoff mechanisms are eliminated or largely overcome by the provision of an exhaust choke valve which closes in response to disengagement of a torque sensing clutch and wherein the releasable clutch member and the valve closure member move axially as a unitary structure to effect practically simultaneous clutch disengagement and motor deenergization. Such a unitary clutch member valve closure member provides these important advantages:

(1) Complex linkages between the clutch and the shutoff valve are eliminated thereby reducing manufacturing costs and repair and maintenance expense.

(2) The elapsed time between clutch disengagement and motor deenergization is minimized thereby making the improved shutoff particularly advantageous in high speed rotary driving hand tools having quick acting clutches intended to isolate the operator from injurious torque reaction forces.

DESCRIPTION OF THE PREFERRED EMBODIMENTS

Figure 1:
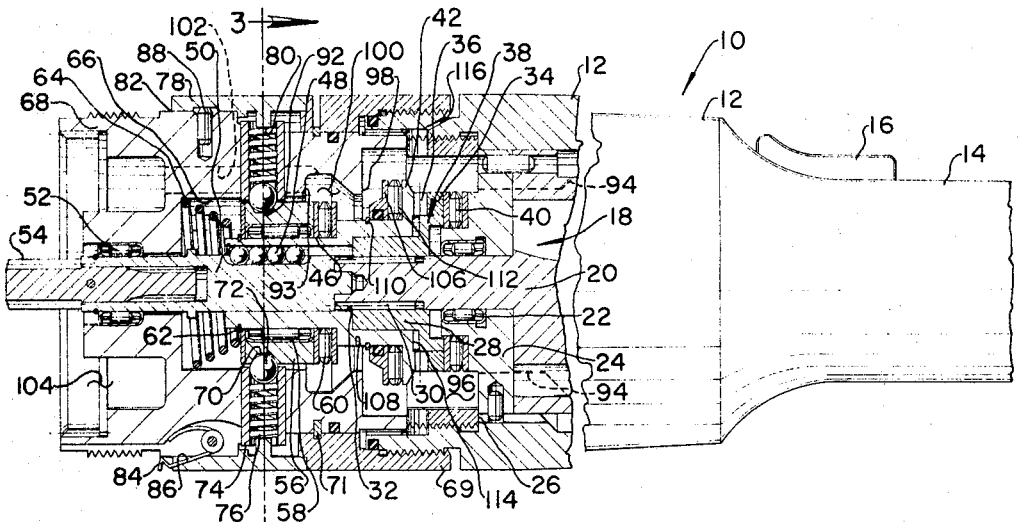
FIG. 1 is a fragmentary view partly in section of a typical fluid power tool illustrating details of the torque control clutch and exhaust shutoff mechanism in the tool operating condition.

Referring to FIG. 1 a typical fluid operated power tool is partially illustrated and designated in general by the numeral 10. The power tool 10 is of a type well known in the art and is used in assembly processes in many industries for tightening threaded fasteners. The complete tool comprises a head portion including a wrench socket or similar device rotatively driven by an intermediate mechanical drive assembly. These portions of the tool being well known have been omitted from the drawing of the subject disclosure since they form no part of the present invention. Tools of the type herein discussed are usually operated by compressed air or other suitable pressure fluid supplied to the tool proper from a source by suitable conduit means, not shown. The tool 10 includes a casing 12 having a handle portion 14 housing an operator actuated motive fluid supply valve, not shown, which is operable to be in an open and closed fluid flow condition in response to actuation of the trigger 16. The tool casing 12 houses a rotary fluid operated motor 18 having a rotor shaft 20 rotatably supported in a bearing 22 which in turn is housed by a motor end plate 24. The motor 18 is retained in the casing 12 by an annular spanner nut 26. The rotor shaft 20 supports a driving clutch hub 28 by means of splines 30. The clutch hub 28 is axially retained on the rotor shaft 20 by a retaining ring 32. The clutch hub 28 is fitted with an annular member 34 having axially projecting dentil teeth 36 formed circumferentially therearound. The annular member 34 is press fitted to the hub 28 to form a driving clutch member 38. Axial thrust on the clutch member 38 in the direction toward the motor end plate 24 is taken by the thrust bearing assembly 40.

Figure 2:
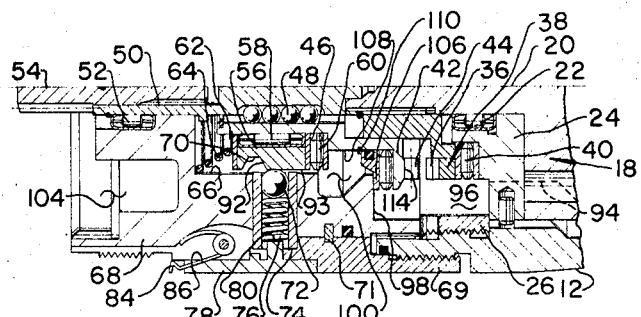
FIG. 2 is a half sectional view of the torque control clutch and exhaust shutoff mechanism of FIG. 1 in the disengaged and tool shutoff condition.
Figure 4:
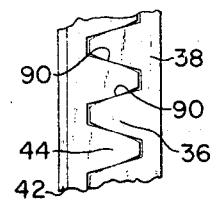
FIG. 4 is a fragmentary view of the torque control clutch blocks illustrating the dentil teeth in the engaged position.

Interfittingly engaged with the driving clutch 38 is a unitary driven clutch and valve closure member 42 having complementary dentil teeth 44 meshing with the teeth 36 of the driving clutch member 38 (see FIG. 4). The driven clutch member 42 includes a hub portion 46 which is keyed by means of plural ball keys 48 to a drive spindle 50. The drive spindle 50 is in turn rotatively journaled in a bearing 52 and includes a projecting end 54 designed for engagement of the afore-mentioned head portion in a manner well known. As can be seen in FIG. 2, the driven clutch member 42 is axially shiftable relative to the spindle 50 on axial bearing means comprising the ball keys 48 to provide for disengagement from the driving clutch member 38. The driven clutch member 42 rotatably supports a torque control ball race 56 about the hub portion 46 by means of a radial bearing assembly 58. Relative axial forces exerted by the clutch member 42 and torque control race 56 are taken by the thrust bearing 60. The torque control race 56 is axially retained on the hub 46 by a retaining ring 62. The complete driven clutch and torque control race assembly is biased by a coil spring 64 to provide for engagement of the driving and driven clutch members 38 and 42 under normal tool operating conditions. The spring 64 is retained in a bore 66 provided in a housing 68. The housing 68 removably forms a part of the tool casing 12 and is threadedly attached thereto by the nut 69 which is keyed to the housing 68 by the key 71.

Figure 3:
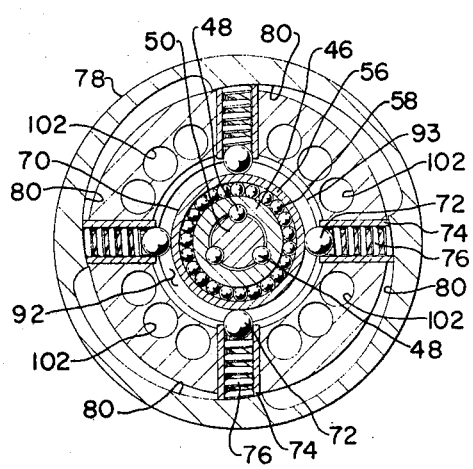
FIG. 3 is a sectional view taken along the line 3—3 of FIG. 1.

The torque control mechanism basically comprises the cylindrical race 56 which has a beveled circumferential groove 70 in which detent means consisting of a plurality of ball bearing elements 72 are radially retained and circumferentially spaced by tubular bushings 74 enclosing coil spring members 76. As can be seen in FIG. 3, the torque control springs 76 are radially retained and variably compressible by a torque control ring 78 having spiral cam surfaces 80 formed inwardly thereon. Viewing FIG. 1, the torque control ring 78 is rotatively piloted on the exterior diameter 82 of the housing 68 and is locked in various rotative positions by a spring 84 biased into a groove 86. The torque control ring 78 is also axially retained on the housing 68 by a pin 88. The bearing elements 72 form resilient journaling means to aid in supporting the clutch member 42 and the spindle 50.

The operation of the torque control clutch is basically dependent on the tendency, in operation, for the driving and driven clutch members 38 and 42 to axially separate thereby disengaging the tool motor 18 from the drive spindle 50. The complementary dentil teeth 36 and 44 on the driving clutch member 38 and driven clutch member 42, respectively are formed with a predetermined tooth profile 90 (FIG. 4) which provides for a relatively high force component in the axial direction tending to separate the teeth when torque effort is being transmitted from the driving clutch member 38 to the driven clutch member 42.

Resistance to the axial shifting of the driven clutch member 42 is provided by the torque control ball bearings 72 biased to ride in the beveled groove 70 in the ball race 56. However, due to the sloping wall 92 of the groove 70, any force tending to axially shift the driven clutch member 42 will produce a radial component tending to displace the balls 72 from the groove 70 and permit complete and free axial shifting of the clutch member 42 to the disengaged position shown in FIG. 2. Control over the magnitude of the clutch separating force and hence the tool driving torque is accomplished by rotative adjustment of the torque control ring 78 so that the variable cam surfaces 80 will operate to increase or decrease the compression of the torque control springs 76 which in turn will variably oppose the radial force component tending to displace the ball bearings 72 from the groove 70.

As previously mentioned a particularly advantageous aspect of the present invention is the virtually simultaneous clutch disengagement and motive fluid exhaust choking to shut off the fluid flow through the motor. Referring to FIG. 1, exhaust flow of motive fluid from the motor 18 takes place by way of passage means comprising conduits 94 opening into the space 96 formed by the nut 26 and the housing 68, past a surface 98 into an annular portion 100, through plural conduits 102 (see FIG. 3) and thence by way of the space 104 through suitable exaust means in the head portion, not shown, to the exterior of the tool. Exhaust choking to shut off the motor 18 is accomplished by the unitary driven clutch and valve closure 42 which also comprises the plate 106 retained on the diameter 108 by a ring 110 and serving as a race for the thrust bearing 112 and also serving as a valve closure element to seat against the surface 98. As can be seen in FIG. 2 the driven clutch member 42 upon disengagement from the driving clutch member 38 will shift axially until the plate 106 seats against the surface 98 to shut off communication of the area 96 with the annular area 100 and thereby choke off motor fluid flow. A rapid pressure increase in the space 96 will occur immediately as the member 42 moves to choke the fluid flow and as long as the tool operator retains the supply valve in the open position pressure fluid will act on the surface 114 of the clutch member 42 to hold the clutch disengaged and the exhaust flow of motive fluid choked off.

In operation, a desired torque control shutoff valve would be determined by rotatively adjusting the ring 78 to place a given compression force on the springs 76 and the torque control ball bearings 72. Prior to operation of the tool the position of the clutch members would be according to FIG. 1. The tool 10 would be applied to the fastener to be tightened and the operator would commence the operating cycle by depressing the trigger 16 opening the fluid supply valve to provide fluid power to the motor 18. Rotary motion would be transmitted from the motor 18 to the spindle 50 as previously described. As the torsional resistance of the fastener or other tool workpiece increased the complementary dentil teeth 36 and 44 on the driving clutch 38 and driven clutch 42 would tend to separate to axially shift the driven clutch and toque control assembly. As the radial inward force of the ball bearings 72 biased into the groove 70 by the springs 76 was exceeded by the opposing radial force tending to displace the balls from the groove the clutch member 42 would move axially to separate the driving and driven clutch member. The separation time is normally very short being in fact a fraction of a second but depending to some extent on the torque buildup characteristics of the tool workpiece. The speed of clutch disengagement is provided by the fact that as the balls 72 are pushed out of the groove 70 a position is reached where the radial force component acting to displace the ball bearings 72 from the groove 70 become relatively great. As the ball bearings 72 move out of the groove 70 onto the diameter 93, the clutch and valve closure member 42 virtually snaps out of engagement and simultaneously seats the plate 106 on the surface 98 to choke off exhaust fluid flow and stop the motor 18. Free axial movement of the unitary driven clutch and valve closure member is facilitated by the manner in which it is supported by the ball keys 48 and resiliently journaled by the torque control ball bearings 72. The tool 10 is thus stopped at a predetermined torque value by positive mechanical disengagement to prevent excessive stress on the fastener being worked and to prevent reaction forces from injuring the tool operator. Furthermore, by means of simple and direct action the flow of motive fluid through the tool is interrupted. As long as the operator maintains the supply valve in the open position, fluid pressure force from the tool inlet will act on the pressure surface 114 to hold the clutch disengaged. However, when the trigger 16 is released to close the supply valve pressure fluid in the motor 18 and the area 96 will rapidly bleed out through the passage 116 relieving the pressure force on the surface 114 and permitting the bias spring 64 to reengage the driven clutch member 42 with the driving clutch member 38, and to reseat the ball bearings 72 in the groove 70. The tool will then be ready for another operating cycle.

Although a preferred embodiment of the present invention has been illustrated and described in detail, it will be appreciated that various alterations can be made in the detailed design of the torque control mechanism and combination clutch and valve closure member. For example, a number of well known clutch biasing devices such as axially biasing adjustable spring members could be employed to resist the clutch separating forces in place of the radially displaceable ball bearings. However, the preferred embodiment not only provides quick and positive clutch and valve shutoff action but achieves the objects of the invention with a minimum of mechanical elements to provide greater tool reliability and availability.

What is claimed is:

1. In a fluid operated tool:
a fluid operated motor drivingly connected to a drive spindle, said motor including a drive shaft;
an exhaust passage in communication with said motor for conducting exhaust fluid therefrom to the exterior of said tool;
clutch means interposed in said passage between said motor and the exterior of said tool and interconnecting said motor and said drive spindle, said clutch means comprising;
a driving clutch member fixed against relative rotation with respect to said motor drive shaft;
a driven clutch member drivingly engaged with said spindle and capable of engaging and disengaging with said driving clutch member, said driven clutch member being axially shiftable but nonrotatable with respect to said spindle, said driven clutch member including valve means carried thereby; and, in response to a predetermined torque acting on said clutch means, said driven clutch member is axially shiftable with respect to said drive spindle to simultaneously disengage from said driving clutch member and cause said valve closure means to shut off the flow of exhaust fluid in said passage.

2. The invention set forth in claim 1 wherein:
said driving and driven clutch members include complementary interengaging teeth cooperable to transmit torque from said motor to said spindle through said clutch means, and in response to a predetermined torque said complementary teeth operate to disengage said driven clutch member from said driving clutch member thereby simultaneously shutting off the flow of exhaust fluid in said passage.

3. The invention set forth in claim 1 wherein:
said valve closure means comprises a closure element mounted on said driven clutch member and axially moveable therewith to close said exhaust passage means simultaneously with the disengagement of said clutch means.

4. The invention according to claim 3 wherein:
said driven clutch member includes a pressure surface thereon responsive to a pressure force exerted on said surface by said exhaust fluid flowing from said motor to bias said clutch member and said valve closure element in the clutch disengaged, motor fluid shutoff condition.

5. The invention according to claim 4 together with:
pressure relief means operable to vent pressure fluid from said exhaust passage means between said motor and said closure element to relieve said pressure force acting on said pressure surface.

6. The invention set forth in claim 3 wherein:
said closure element is rotatably carried by said driven clutch member and said element is operable to rotate with said driven clutch member when said clutch means is engaged.

7. The invention set forth in claim 1 wherein:
said driven clutch member includes torque control means including biasing means operable to bias said clutch and valve closure means in the clutch engaged and valve open condition.

8. The invention set forth in claim 7 wherein:
said torque control means includes a circumferential groove and resilient detent means journalling said driven member.

9. The invention set forth in claim 8 wherein:
said resilient detent means comprises a plurality of ball bearings radially biased in said groove and said torque control means includes means operable to variably bias said bearings in said groove.

References Cited

UNITED STATES PATENTS

| 2,884,103 | 4/1959 | Connell | 192—56 |
| 3,442,362 | 5/1969 | Bangerter | 192—150 |
| 3,220,526 | 11/1965 | Gaffiker | 192—150 |
| 3,205,986 | 9/1965 | Kramer | 192—150 X |
| 3,253,662 | 5/1966 | Sacchini | 173—12 |
| 3,288,258 | 11/1966 | Taylor | 192—150 |
| 3,298,481 | 1/1967 | Schaedler et al. | 192—150 |

BENJAMIN W. WYCHE, III, Primary Examiner

U.S. Cl. X.R.

192—56, 91, .034, 114; 251—253